United States Patent
Ooshima et al.

(10) Patent No.: US 12,122,122 B2
(45) Date of Patent: Oct. 22, 2024

(54) RESIN-COATED METALLIC PLATE, AND METALLIC CAN PRODUCED BY PROCESSING SAID RESIN- COATED METALLIC PLATE

(71) Applicants: TOYO KOHAN CO., LTD., Tokyo (JP); TOYO SEIKAN CO., LTD., Tokyo (JP)

(72) Inventors: Yuuto Ooshima, Kudamatsu (JP); Masami Suenaga, Kudamatsu (JP); Satoshi Kawamura, Kudamatsu (JP); Yuji Funagi, Yokohama (JP); Shiori Adachi, Yokohama (JP); Shigeya Takahashi, Yokohama (JP); Yasuhiro Yukawa, Yokohama (JP)

(73) Assignees: TOYO SEIKAN CO., LTD., Tokyo (JP); TOYO KOHAN CO., LTD., Tokyo (JP)

( * ) Notice: Subject to any disclaimer, the term of this patent is extended or adjusted under 35 U.S.C. 154(b) by 0 days.

(21) Appl. No.: 16/628,143

(22) PCT Filed: Jun. 23, 2018

(86) PCT No.: PCT/JP2018/023908
§ 371 (c)(1),
(2) Date: Jan. 2, 2020

(87) PCT Pub. No.: WO2019/009108
PCT Pub. Date: Jan. 10, 2019

(65) Prior Publication Data
US 2020/0122431 A1    Apr. 23, 2020

(30) Foreign Application Priority Data
Jul. 5, 2017    (JP) .................. 2017-132189

(51) Int. Cl.
*B32B 15/09*    (2006.01)
*B32B 1/00*    (2006.01)
(Continued)

(52) U.S. Cl.
CPC ............... *B32B 15/09* (2013.01); *B32B 1/00* (2013.01); *B32B 15/20* (2013.01); *B32B 27/08* (2013.01);
(Continued)

(58) Field of Classification Search
CPC ........... B32B 15/09; B32B 27/08; B32B 1/02; B32B 15/20; B32B 27/36; B32B 2270/00;
(Continued)

(56) References Cited

FOREIGN PATENT DOCUMENTS

| JP | 07238176 A | 9/1995 |
|---|---|---|
| JP | 07330924 A | 12/1995 |

(Continued)

*Primary Examiner* — James C Yager
(74) *Attorney, Agent, or Firm* — BROWDY AND NEIMARK, PLLC (57) ABSTRACT

[Problem] To provide: a resin-coated metallic plate which cannot undergo the occurrence of a retort brushing phenomenon (the formation of white spots) or the delamination of a film under retort sterilization treatment conditions; and others. [Solution] A resin-coated metallic plate having a resin layer (A) and a resin layer (B) is characterized in that the resin layer (A) contains 50 to 80 wt % of a polyethylene terephthalate-based resin (I) and 20 to 50 wt % of a polybutylene terephthalate-based resin (II), wherein the resin layer (B) contains 50 to 80 wt % of a polyethylene terephthalate-based resin (III) and 20 to 50 wt % of a polybutylene terephthalate-based resin (II), the polyethylene terephthalate-based resin (I) has a melting point of 210 to 230° C. inclusive, the polybutylene terephthalate-based resin (II) has a melting point of 215 to 225° C. inclusive, and (Continued)

the polyethylene terephthalate-based resin (III) has a melting point of higher than 230° C. and 205° C. or lower.

9 Claims, 2 Drawing Sheets

(51) Int. Cl.
  *B32B 15/20* (2006.01)
  *B32B 27/08* (2006.01)
  *B32B 27/36* (2006.01)
  *B65D 1/16* (2006.01)
  *B65D 25/34* (2006.01)

(52) U.S. Cl.
  CPC .............. *B32B 27/36* (2013.01); *B65D 1/165* (2013.01); *B65D 25/34* (2013.01); *B32B 2270/00* (2013.01); *B32B 2439/66* (2013.01); *B32B 2439/70* (2013.01); *Y10T 428/1352* (2015.01); *Y10T 428/1355* (2015.01)

(58) Field of Classification Search
  CPC . B32B 2439/66; B32B 2439/70; B65D 1/165; B65D 25/34; Y10T 428/1352; Y10T 428/1355
  See application file for complete search history.

(56) References Cited

FOREIGN PATENT DOCUMENTS

| | | |
|---|---|---|
| JP | 08276553 A | 10/1996 |
| JP | 2002355926 A | 12/2002 |
| JP | 200311309 A | 1/2003 |
| JP | 2003268131 A | 9/2003 |
| JP | 200417438 A | 1/2004 |
| JP | 2004009599 A | 1/2004 |
| JP | 2008143184 A | 6/2008 |
| WO | 2015012222 A1 | 1/2015 |

RESIN-COATED METALLIC PLATE, AND METALLIC CAN PRODUCED BY PROCESSING SAID RESIN- COATED METALLIC PLATE

TECHNICAL FIELD

The present invention relates to a resin-coated metal sheet and a metal can formed by working the resin-coated metal sheet. Specifically, the present invention relates to a resin-coated metal sheet capable of suppressing occurrence of retort blushing (white spots) during retort sterilization treatment, and also to a metal can formed by working the resin-coated metal sheet.

BACKGROUND ART

Known metal cans for beverages and foods include 3-piece cans made of a can body and a top and bottom lid, 2-piece cans made of a can body and a can lid, and the like. As metal sheets known to be useful as materials for these 3-piece cans or 2-piece cans, there are resin-coated metal sheets in each of which a thermoplastic resin film is laminated on a surface of a metal sheet to prevent corrosion. As the thermoplastic resin film, a polyester film or the like is used.

Metal cans for beverages and foods, such as those described above, need to withstand retort sterilization treatment to be applied after filling contents. For retort sterilization treatment, there is a plurality of methods such as batchwise and continuous methods. Batchwise retort treatment, for example, includes a step in which metal cans are exposed to high-temperature steam for several minutes to several tens minutes. Continuous retort treatment, on the other hand, includes a step in which metal cans, which have been carried into a sterilization chamber by an endless chain conveyor, are exposed to high-temperature steam for several minutes to several tens minutes.

Whichever the treatment is applied, the environment is severe for the metal sheet and the thermoplastic resin film laminated on the surface of the metal sheet. There is accordingly an outstanding demand for a thermoplastic resin film for lamination on a metal sheet such that no delamination or the like of the film from the metal sheet will occur even when subjected to such a severe environment.

Investigations have also been made to date about the problem of retort blushing (white spots) that may occur on the top and bottom lids of a 3-piece can or on the can bottom of a 2-piece can upon such retort sterilization treatment as described above. The cause of occurrence of retort blushing (white spots) has not been completely ascertained yet. As a reason, however, retort blushing (white spots) is presumably attributed to deposition of water droplets on a can lid or can bottom upon retort sterilization and crystallization of a film, which has melted into an amorphous state upon lamination, at an area where the water droplets are deposited.

As an alternative, retort blushing (white spots) is also presumably attributed to transmission of water droplets, which have deposited on a can lid or can bottom, through a thermoplastic resin film and formation of gas bubbles between a metal sheet and the resin film. To suppress the occurrence of such retort blushing (white spots), techniques are disclosed as will be described hereinafter.

For example, PTL 1 (WO 2015/012222A) discloses, as an organic resin-coated metal sheet for beverages and foods, the organic resin-coated metal sheet having retort blushing resistance and can manufacturability, an organic resin-coated metal sheet with an unstretched film laminated on at least one side of the metal sheet. The unstretched film is characterized by being composed of a polyester based resin composition in which a crystalline polyester (II) with a polybutylene terephthalate based resin contained as a principal component therein is blended in an blend amount of from 20 to 45 wt % with a copolymer polyester (I) with a polyethylene terephthalate based resin contained as a principal component therein.

PTL 2 (JP Hei 07-330924A) describes, as a film excellent in retort resistance, a stretched polyester film bondable to and forming-workable together with a metal sheet. The stretched polyester film is a polyester film formed of 99 to 60 wt % of a polyester, which has a melting point of 210° C. to 245° C. and a glass transition temperature of not lower than 60° C., and 1 to 40 wt % of another polyester, which contains polybutylene terephthalate as a principal component and has a melting point of 180° C. to 223° C., and containing free monomers at not higher than 300 ppm.

PTL 3 (JP 2003-268131A) describes, as a film having excellent design properties so that no whitening of the film occurs even when laminated with a metal sheet and subjected to heat treatment at around its melting point or higher, a polyester film formed of 10 to 70 wt % of ethylene terephthalate and 90 to 30 wt % of a crystalline polyester. The crystalline polyester is one of polybutylene terephthalate (PBT), polytrimethyiene terephthalate (PTT), and polyethylene-2,6-naphthalate (PEN). Upon cooling of the polyester film, a recrystallization peak with a half value width of not greater than 0.2 is observed.

PTL 4 (JP 2008-143184A) describes, as a laminated metal sheet for a metal can-body and can-lid material in which whitening of a film does not occur even when the film is subjected to crystallization treatment, a laminated metal sheet formed of a blend of 10 to 70 wt % of a polyethylene terephthalate based resin and 90 to 30 wt % of a polvbutviene terephthalate based resin and having two or more melting point peaks.

CITATION LIST

Patent Literature

[PTL 1]
  WO 2015/012222A
[PTL 2]
  JP Hei 07-330924A
[PTL 3]
  JP 2003-268131A
[PTL 4]
  JP 2008-143184A

SUMMARY

Technical Problems

However, the above-described related arts were unable to sufficiently overcome the above-mentioned problems of retort blushing (white spots) and film delamination under diversified retort sterilization treatment conditions.

As a result of extensive investigations, the present inventors have found that the above-described problems of retort blushing (white spots) and film delamination can be overcome by disposing a plurality of blend resin layers of a polyethylene terephthalate based resin and a polybutylene terephthalate based resin, which have predetermined characteristics, on at least one side of a metal sheet, leading to the present invention.

Solution to Problems

Described specifically, the present invention has the following characteristic configurations:

(1) A resin-coated metal sheet including:
a metal sheet;
a resin layer (A) disposed on at least one side of the metal sheet; and
a resin layer (B) disposed between the resin layer (A) and the metal sheet, in which
the resin layer (A) contains 50 to 80 wt % of a polyethylene terephthalate based resin (I) and 20 to 50 wt % of a olybutylene terephthalate based resin (II),
the resin layer (B) contains 50 to 80 wt % of a polyethylene terephthalate based resin (III) and 20 to 50 wt % of the polybutylene terephthalate based resin (II), and
the polyethylene terephthalate based resin (I) has a melting point of not lower than 210° C. but not higher than 230° C., the polybutylene terephthalate based resin (II) has a melting point, of not lower than 215° C. but not higher than 225° C., and the polyethylene terephthalate based resin (III) has a melting point of higher than 230° C. but not higher than 250° C.

(2) The resin-coated metal sheet as described in (1), in which
the resin layer (A) has a heating crystallization temperature at 95±5° C. and a cooling crystallization temperature at lower than 183° C. in a measurement during a first scan by differential scanning calorimetry (DSC), and
the resin layer (B) has no heating crystallization temperature at 95±5° C. and a cooling crystallization temperature at not lower than 183° C. in a measurement during a first scan by DSC.

(3) The resin-coated metal sheet as described in (1) or (2), wherein the resin layer (A) and the resin layer (B) each have a logarithmic damping ratio of smaller than 0.3 at measurement temperatures of 65° C. to 75° C. and a logarithmic damping ratio of smaller than 0.35 at measurement temperatures of 100° C. to 130° C. when measured by a rigid-body pendulum type physical properties testing instrument.

(4) The resin-coated metal sheet as described in any one of (1) to (3), in which the resin layer (A) and the resin layer (B) have a total thickness of 5 to 15 μm.

(5) A metal can formed from the resin-coated metal sheet as described in any one of (1) to (4), with the resin layer (A) disposed as an outer surface of the can.

(6) The metal can as described in (5), in which the resin layer (A) has a contact angle of not greater than 42° with a wetting index liquid No. 40 having a wetting tension of 40.0 mN/m.

(7) The metal can as described in (5) or (6), in which the resin layer (A) has a water vapor transmission rate of not greater than 400 g/m$^2$•day at a can body portion.

(8) The metal can as described in any one of (5) to (7), in which the resin layers (A) and (B) have an oriented crystallization peak intensity of not smaller than 28 cps/μm at a can body portion when measured by X-ray diffractometry.

Advantageous Effects of Invention

According to the resin-coated metal sheet and the metal can according to the present invention, the metal can having been formed by working the resin-coated metal sheet, the occurrence of retort blushing (white spots) and film delamination can be suppressed in beverage cans and food cans under diversified retort sterilization treatment conditions.

Therefore, the present invention can provide a resin-coated metal sheet that has no problem in workability (drawing and ironing workability, ironing workability) and working adhesion with a resin upon can manufacturing, resistance to scratches of outer surfaces of cans by contact between the cans themselves or with conveyor elements during conveyance, adhesion with a coating formulation or printing ink upon coating or printing after can manufacturing, and the like, all of which are generally required for beverage cans and food cans, and can also provide a metal can formed by working the resin-coated metal sheet.

DESCRIPTION OF EMBODIMENT

Figure 1:
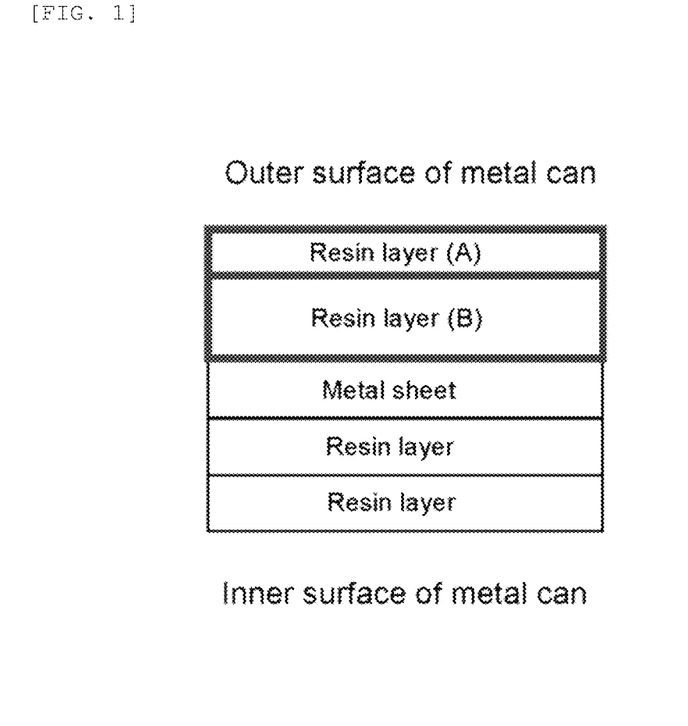
FIG. 1 is a concept diagram illustrating one example of a resin-coated metal sheet according to the present invention.

The present invention will hereinafter be described in detail based on the following embodiment. It is, however, to be noted that the present invention should not be limited to the following embodiment.
[Resin-Coated Metal Sheet]
As illustrated in FIG. 1, a resin-coated metal sheet according to the present embodiment includes a metal sheet, a resin layer (A) disposed on at least one side of the metal sheet, and a resin layer (B) disposed between the resin layer (A) and the metal sheet.
(Metal Sheet)
As the metal sheet, a known metal sheet used in general metal can bodies or can lids can be used, and no particular limitation is imposed thereon. As an example of a preferably usable metal sheet, a surface-treated steel sheet or a light metal sheet such as an aluminum sheet or aluminum alloy sheet can be used.
As the surface-treated steel sheet, aluminum killed steel, low-carbon steel or the like can be used. For example, a cold-rolled steel sheet can be used after subjecting it to annealing and then to secondary cold rolling, and further applying one or more of tin plating, nickel plating, zinc plating, electrolytic chromate treatment, chromate treatment, non-chromate treatment using aluminum or zirconium, and the like.
As the light metal sheet, the aluminum sheet or the aluminum alloy sheet is used. As examples of the aluminum alloy sheet, A3000 series (Al—Mn system) can be used for metal can bodies. For can lids, on the other hand, A5000 series (Al—Mg system) can be used, for example.
It is to be noted that the thickness and the like of such a metal sheet can be selectively determined as desired depending on the purpose of use.
(Resin Layer)
In the present embodiment, a resin layer is disposed on at least one side of the metal sheet. As the resin layer, the resin layer (B) is disposed so as to be in contact with the metal sheet, and on the resin layer (B), the resin layer (A) which is of a kind different from that of the resin layer (B) is disposed. In other words, the resin-coated metal sheet of the present embodiment includes the metal sheet, the resin layer (A) disposed on at least one side of the metal sheet, and the resin layer (B) disposed between the resin layer (A) and the metal sheet.

A description will first be made about the resin layer (A).

The resin layer (A) used in the present embodiment is formed from a resin containing 50 to 80 wt % of a polyethylene terephthalate based resin (I) and 20 to 50 wt % of a polybutylene terephthalate based resin (II).

The above-described expression "resin containing" means, in other words, that the polyethylene terephthalate based resin (I) and the polybutylene terephthalate based resin (II) are contained as components in the resin layer (A). Described specifically, the resin layer (A) is obtained by mixing (hereinafter called "blending") the polyethylene terephthalate based resin (I) and the polybutylene terephthalate based resin (II).

It is to be noted that the term "polyethylene terephthalate based resin" as used in the present embodiment includes polyethylene terephthalate (PET) resin alone and copolymer resins containing polyethylene terephthalate as a principal component. Similarly, it is also to be noted that the term "polybutylene terephthalate based resin" as used in the present embodiment includes polybutylene terephthalate (PBT) resin alone and copolymer resins containing polybutylene terephthalate as a principal component.

In the resin layer (A), the contents of the polyethylene terephthalate based resin (I) and the polybutylene terephthalate based resin (II) are 50 to 80 wt % and 20 to 50 wt %, respectively, for a reason to be described hereinafter.

Now, polybutylene terephthalate (PBT) is generally known as a resin having high stiffness and high crystallization rate.

If the content of the polybutylene terephthalate based resin (II) is lower than 20 wt % in the present embodiment, the crystallization rate of the resin layer (A) hence decreases relatively. In this case, there is a high possibility of formation of large crystals in the resin layer (A). Such a low content is therefore not preferred from the viewpoint of suppressing the occurrence of retort blushing (white spots).

If the content of the polybutylene terephthalate based resin (II) is higher than 50 wt %, on the other hand, the resin layer (A) has an excessively high crystallization rate, leading to a high possibility that the resin layer (A) will become cloudy. Such a high content is therefore not preferred.

A description will next be made about the resin layer (B).

The resin layer (B) used in the present embodiment is formed from a resin containing 50 to 80 wt % of a polyethylene terephthalate based resin (III) and 20 to 50 wt % of the polybutylene terephthalate based resin (II). In other words, the polyethylene terephthalate based resin (III) and the polybutylene terephthalate based resin (II) are contained as components in the resin layer (B). Described specifically, the resin layer (B) is obtained by mixing (hereinafter called "blending") the polyethylene terephthalate based resin (III) and the polybutylene terephthalate based resin (II).

In the resin layer (B), the contents of the polyethylene terephthalate based resin (III) and the polybutylene terephthalate based resin (II) are 50 to 80 wt % and 20 to 50 wt %, respectively, for a reason to be described hereinafter.

If the content of the polybutylene terephthalate based resin (II) is lower than 20 wt % in the present embodiment, the crystallization rate of the resin layer (B) hence decreases. Accordingly, there is a high possibility of formation of large crystals in the resin layer (B). Such a low content is therefore not preferred from the viewpoint of suppressing the occurrence of retort blushing (white spots).

If the content of the polybutylene terephthalate based resin (II) is higher than 50 wt %, on the other hand, the resin layer (B) has an excessively high crystallization rate, leading to a high possibility that the resin layer (B) will become cloudy. Such a high content is therefore not preferred.

A description will next be made about details of the resins contained in the resin layer (A) and the resin layer (B).

First, the polyethylene terephthalate based resin (I) and the polybutylene terephthalate based resin (II) are contained in the resin layer (A) as mentioned above.

In the present embodiment, the polyethylene terephthalate based resin (I) may preferably be a copolymer resin containing polyethylene terephthalate as a principal component.

Described specifically, the dicarboxylic acid component contained in the polyethylene terephthalate based resin (I) may preferably include, in addition to terephthalic acid, at least one dicarboxylic acid selected from the group consisting of isophthalic acid (IA), orthophthalic acid, p-β-oxyethoxybenzoic acid, naphthalene-2,6-dicarboxylic acid, diphenoxyethane-4,4'-dicarboxylic acid, 5-sodium sulfoisophthalic acid, hexahydroterephthalic acid, adipic acid, sebacic acid, trimellitic acid, and pyromellitic acid. Among these, the inclusion of isophthalic acid is particularly preferred from the viewpoint of workability or the like into a metal can.

As the glycol component contained in the polyethylene terephthalate based resin (I), ethylene glycol alone is suited. However, one or more of other glycol components, for example, propylene glycol, 1,4-butanediol, diethylene glycol, 1,6-hexylene glycol, cyclohexane dimethanol, bisphenol A ethylene oxide addition product, and the like may also be contained to an extent not impairing the essence of the present invention.

In the present embodiment, the content of isophthalic acidic; the polyethylene terephthalate based resin (I) may preferably be 9 to 15 mol % for a reason to be described hereinafter. If the content of isophthalic acid in the polyethylene terephthalate based resin (I) is lower than 9 mol %, the adhesion with printing ink or varnish is lowered. Such a low content is therefore not preferred.

If the content of isophthalic acid in the polyethylene terephthalate based resin (I) exceeds 15 mol %, on the other hand, the resin layer (A) has a lower crystallization rate, thereby possibly causing retort blushing (white spots). Such a high content is therefore not preferred.

More preferably, the content of isophthalic acid in the polyethylene terephthalate based resin (I) may be 9 to 10 mol %.

In the present embodiment, the polyethylene terephthalate based resin (I) may preferably have a melting point of not lower than 210° C. but not higher than 230° C. It is to be noted that the melting point of a resin can be measured using differential scanning calorimetry (DSC).

It is also to be noted that is the present embodiment, objects of the present invention can be achieved insofar as the polyethylene terephthalate based resin (I) has an intrinsic viscosity (IV) in a normally acceptable range.

On the other hand, the polybutylene terephthalate based resin (II) may preferably be polybutylene terephthalate resin alone (homopolymer) in the present embodiment from the viewpoint of suppressing the occurrence of retort blushing (white spots) on metal cans and can lids.

Nonetheless, the polybutylene terephthalate based resin (II) may also be a copolymer resin within a range not impairing the objects of the present invention. In this case, one or more of known dicarboxylic acid components other than terephthalic acid and/or known glycol components other than 1,4-butanediol may be contained as a copolymerization component or copolymerization components.

In the present embodiment, the polybutylene terephthalate based resin (II) may preferably have a melting point of not lower than 215° C. but not higher than 225° C. Although the melting point of homobutylene terephthalate is 225° C., some melting point depressions are permissible in the present embodiment through transesterification with polyethylene terephthalate upon copolymerization or upon formation of the resin layers. However, a melting point lower than 215° C. is not preferred because such a low melting point may lead to insufficient suppressive effect on the occurrence of retort blushing.

Further, the polybutylene terephthalate based resin (II) may preferably have an intrinsic viscosity (IV) of 0.6 to 1.3, with 1.1 to 1.3 being more preferred in the present embodiment. An intrinsic viscosity (IV) of lower than 0.6 leads to an excessively soft resins, so that the resins tend to rupture upon can manufacturing. Such a low intrinsic viscosity (IV) is therefore not preferred. If the intrinsic viscosity (IV) exceeds 1.3, on the other hand, such an intrinsic viscosity is so high that the production of a resin film itself becomes difficult, and therefore not preferred.

A description will next be made about the polyethylene terephthalate based resin (III) contained in the resin layer (B). It is to be noted that the polybutylene terephthalate based resin (II) contained in the resin layer (B) is the same as the polybutylene terephthalate based resin (II) contained in the resin layer (A) and therefore its description is omitted.

In the present embodiment, the polyethylene terephthalate based resin (III) contained in the resin layer (B) may be polyethylene terephthalate resin alone (homopolymer), or may be a copolymer resin containing polyethylene terephthalate as a principal component.

Described specifically, the dicarboxylic acid component contained in the polyethylene terephthalate based resin (III) may be only terephthalic acid, or may include, in addition to terephthalic acid, at least one dicarboxylic acid component selected from the group consisting of isophthalic acid (IA), orthophthalic acid, p-β-oxyethoxybenzoic acid, naphthalene-2,6-dicarboxylic acid, diphenoxyethane-4,4'-dicarboxylic acid, 5-sodium sulfoisophthalic acid, hexahydroterephthalic acid, adipic acid, sebacic acid, trimellitic acid, and pyromellitic acid.

If the polyethylene terephthalate based resin (III) is a copolymer resin, isophthalic acid is preferred as a copolymerization component from the viewpoint of workability or the like into metal cans.

As the glycol component contained in the polyethylene terephthalate based resin (III), ethylene glycol alone is suited. However, one or more of other glycol components, for example, propylene glycol, 1,4-butanediol, diethylene glycol, 1,6-hexylene glycol, cyclohexane dimethanol, bisphenol A ethylene oxide addition product, and the like may also be contained to an extent not impairing the essence of the present invention.

In the present embodiment, the content of isophthalic acid in the polyethylene terephthalate based resin (III) may preferably be higher than 0 mol % but lower than 9 mol % for a reason to be described hereinafter.

The polyethylene terephthalate based resin (III) is contained in the resin layer (B). If the resin-coated metal sheet with the resin layer (B) laminated thereon is worked into a metal can or can lid, the resin-costed metal sheet with the resin layer (B) laminated thereon is subjected to severe working such as drawing and ironing or ironing. If the content of isophthalic acid in the polyethylene terephthalate based resin (III) is not lower than 9 mol %, the resin layer (B) is considered to have no high adhesion to the metal sheet in the resin-coated metal sheet.

On the other hand, stress remains in the resin layer (B) of the metal can after its manufacture through such severe working as described above. If the metal can proceeds to a step of severe retort sterilization treatment with such stress still remaining, there is a possibility that the adhesion between the resin layer (B) and the metal sheet may be reduced due to the resulting temperature difference and sudden changes in environment. In a worst case, the resin layer (B) may even separate (be delaminated) from the metal sheet.

In order to avoid the above-described problem, the content of isophthalic acid in the polyethylene terephthalate based resin (III) may preferably be higher than 0 mol % but lower than 9 mol % in the present embodiment. The setting of this content can suppress separation of the resin layer (B) from the metal sheet even when the metal can proceeds to the step of severe retort sterilization treatment, because the adhesion of the resin layer (B) to the metal sheet in the resin-coated metal sheet can be considered to be relatively low if the content of isophthalic acid in the polyethylene terephthalate based resin (III) is higher than 0 moles but lower than 9 mol %. As a consequence, effects on the adhesion between the resin layer (B) and the metal sheet become relatively smaller even if the metal can is subjected to a temperature difference and sudden changes in environment in the step of severe retort treatment to which the metal can proceeds subsequent to its manufacture through severe working.

Further, the setting of the content of isophthalic acid at higher than 0 mol % but lower than 9 mol % in the polyethylene terephthalate based resin (III) can also resolve the problem of the occurrence of retort blushing (white spots) at the same time, because the transmission amount of water through the resin layer (B) is small compared with that through the resin layer (A) owing to the setting of the content of isophthalic acid in the above-described range and the resin layer (B) can hence function like a barrier layer to decrease bubbles of water vapor which can occur at the interface between the metal sheet and the resin layer (B). As a consequence, it is thus possible to suppress the phenomenon of occurrence of retort blushing (white spots) at the interface between the metal sheet and the resin layer (B).

For the reason as described above, the content of isophthalic acidic; the polyethylene terephthalate based resin (III) is set at higher than 0 mol % but lower than 9 mol % in the present embodiment, whereby the occurrence of retort blushing (white spots) and the problem of film delamination are overcome at the same time.

It is to be noted that homopolyethylene terephthalate, which does not contain isophthalic acid at all, leads to a substantial reduction in working adhesion and therefore is not preferred. From the viewpoint of overcoming the occurrence of retort blushing (white spots) and the problem of film delamination at the same time as described above, it is more preferred that the content of isophthalic acid in the polyethylene terephthalate based resin (III) is 1 to 8 mol %, with 4 to 6 mol % being still more preferred.

A method for bringing the contents of isophthalic acid in the polyethylene terephthalate based resin (I) and the polyethylene terephthalate based resin (III) into the above-mentioned ranges, respectively, is not limited to a method of copolymerization at desired isophthalic acid contents but also includes a method of blending a polyethylene terephthalate based resin, which contains isophthalic acid at a low content (for example, 2 mol %), and another polyethylene terephthalate based resin, which contains isophthalic acid at a high content (for example, 15 mol %), so that their total content becomes a desired content of isophthalic acid. This blending can be conducted at the same time as the mixing of the polybutylene terephthalate based resin (II).

In the present embodiment, the polyethylene terephthalate based resin (III) may preferably have a melting point of not lower than 230° C. but not higher than 250° C. The melting point of the resin can be measured using differential scanning calorimetry (DSC).

The objects of the present invention can be achieved insofar as the polyethylene terephthalate based resin (III) in the present embodiment has an intrinsic viscosity (IV) in a normally acceptable range.

The resin layer (A) and the resin layer (B) will next be described separately.

First, the resin layer (A) may preferably have a heating crystallization temperature at 95±5° C. and a cooling crystallization temperature at lower than 183° C. in a measurement during a first scan by differential scanning calorimetry (DSC).

Here, the expression "measurement during a first scan by differential scanning calorimetry (DSC)" means that the resin layer (A) or the resin layer (B), which has been allowed to cool to room temperature after the production of the resin-coated metal sheet of the present embodiment, is cut out as a specimen from the resin-coated metal sheet and the specimen is then measured by a differential scanning calorimeter while heating the specimen.

On the other hand, the term "cooling crystallization temperature" in the present embodiment means a cooling crystallization temperature obtained by measuring the specimen with the differential scanning calorimeter while cooling the specimen after the first scan.

In the present embodiment, a peak obtained at 95±5° C. in a measurement during a first scan by DSC with respect to the resin layer (A) represents a heating crystallization temperature.

In general, a cooling crystallization temperature is used as an indication for a solidification rate. In particular, the smaller a difference between a melting point, and a cooling crystallization temperature (a supercooling temperature difference) of a material, the faster the crystallization of the material.

Heating rate and cooling rate in a DSC measurement are generally determined in accordance with JIS K 7210. In the present embodiment, a measurement should be made at a heating rate of 10° C./min and a cooling rate of –10° C./min.

The resin layer (B) may preferably have no heating crystallization temperature at 95±5° C. and a cooling crystallization temperature at not lower than 183° C. in a measurement during a first scan by differential scanning calorimetry (DSC). More specifically, the resin layer (B) may preferably have a heating crystallization temperature (peak) to be observed at 100° C. or higher, which is higher than the range of 95±5° C., in a measurement during a first scan by DSC.

In the present embodiment, the cooling crystallization temperature (peak) appears in different ways between the resin layer (A) and the resin layer (B) in the measurements during a first scan by differential scanning calorimetry (DSC). A reason for this difference and effects available from the difference will be described hereinafter. Comparing the resin layer (A) and the resin layer (B), the resin layer (B) is higher in crystallization rate, so that the water vapor transmissibility of the resin film can be lowered. As a result, it is possible to decrease the transmission of water vapor to the metal sheet during retort sterilization treatment. The occurrence of film delamination can be suppressed accordingly.

(Logarithmic Damping Ratio by Rigid-Body Pendulum Type Physical Properties Testing instrument)

In the present embodiment, the resin layer (A) and the resin layer (B) may preferably have a logarithmic damping ratio of smaller than 0.3 at measurement temperatures of 65° C. to 75° C. and a logarithmic damping ratio of smaller than 0.35 at measurement temperatures of 100° C. to 130° C. when measured by a rigid-body pendulum type physical properties testing instrument.

Described specifically, it is preferred from the viewpoint of simultaneously overcoming the occurrence of retort blushing (white spots) and the problem of film delamination after can manufacturing that, when the resin-coated metal sheet of the present embodiment is measured at a resin surface thereof by the rigid-body pendulum type physical properties testing instrument (measurement conditions: 2.0 mm pipe edge diameter, 12.4 g frame weight), the logarithmic damping ratio is smaller than 0.3 at measurement temperatures of 65° C. to 75° C. and is smaller than 0.35 at measurement temperatures of 100° C. to 130° C.

On the hand, a logarithmic damping ratio of not smaller than 0.3 at measurement temperatures of 65° C. to 75° C. means that the resin layer has a high hardness, and such a large logarithmic damping ratio is therefore not preferred from the viewpoint of workability during can manufacturing. Further, a logarithmic damping ratio of not smaller than 0.35 at measurement temperatures of 100° C. to 130° C. is not preferred either from the viewpoint of the adhesion between the resins and the metal sheet upon can manufacturing.

Upon measurement by the rigid-body pendulum type physical properties testing instrument (which may hereinafter also be called "rigid-body pendulum measurement"), a pendulum is placed on a material to be measured, and the material is measured for dynamic viscoelasticity by continuously varying the temperature of the material under measurement while swinging the pendulum. With this instrument, a logarithmic damping ratio is measured as one piece of data.

Figure 2:
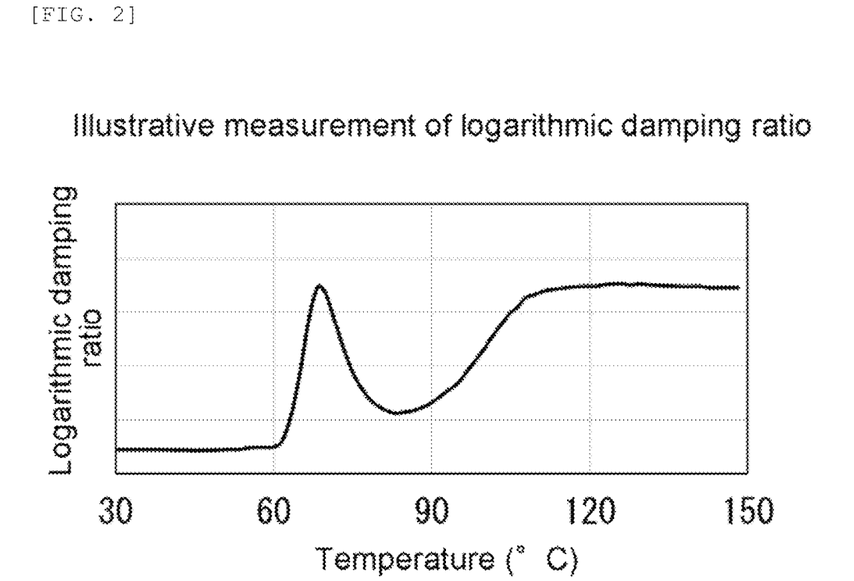
FIG. 2 is a diagram illustrating measurement results of a logarithmic damping ratio in an embodiment of the present invention.

In FIG. 2, illustrative measurement results of a logarithmic damping ratio in the present embodiment are illustrated. It is to be noted that the peak of the left rise illustrated in the diagram of FIG. 2 suggests a value close to the glass transition temperature of the resin and the right rise suggests a degree of softening of the resin during heating.

In the resin-coated metal sheet of the present embodiment, the crystallization rate of each resin varies depending on the content of the polybutylene terephthalate based resin (II). This variation affects the degree of softening of the resin upon heating. If the content of the polybutylene terephthalate based resin (II) is low, the crystallization rate becomes slow so that the resin is relatively soft and the degree of softening upon heating tends to increase. If the content of the polybutylene terephthalate based resin (II) is high, on the other hand, the crystallization rate becomes fast so that the resin is relatively hard and the degree of softening upon heating tends to decrease.

If a rigid-body pendulum measurement is made using each resin of the present embodiment, a high content of the polybutylene terephthalate based resin (II) results in a small degree of softening upon heating so that no braking is applied to the swing of the pendulum and the logarithmic damping ratio decreases. If the content of the polybutylene terephthalate based resin (II) is low, on the other hand, the degree of softening upon heating is large so that braking is applied to the pendulum, its swing is damped, and the logarithmic damping ratio increases.

According to the knowledge of the present inventors, the softness or hardness of a resin layer can be evaluated by determining its logarithmic damping ratio as described above, thereby making it possible to obtain a resin-coated metal sheet that can simultaneously overcome the occurrence of retort blushing (white spots) and the problem of film delamination after can manufacturing.

(Thicknesses and Thickness Ratio of Resin Layers)

In the resin-coated metal sheet of the present embodiment, the total thickness of the resin layer (A) and the resin layer (B) may preferably be 5 to 15 μm from the viewpoint of the adhesion or the like between the resin film and the metal sheet upon can manufacturing.

Further, the thickness ratio of the resin layer (A) to the resin layer (B) may be preferably 1:9 to 5:5, notably 2:8 to 4:6 in the state of the resin-coated metal sheet (before can manufacturing). Whatever the case may be, it is desired in the present embodiment that the thickness of the resin layer (B) is greater than that of the resin layer (A).

By setting the total thickness of the resin layer (A) and the resin layer (B) and the thickness ratio of the individual layers within the corresponding ranges described above, it is possible in the present embodiment to suppress the occurrence of retort blushing (white spots) after can manufacturing.

In general, water, which has transmitted through a resin layer and has reached an interface between a metal sheet and the resin layer upon retort sterilization treatment, can become a cause of the occurrence of retort blushing (white spots). In the present embodiment, the occurrence of retort blushing (white spots) can be suppressed owing to the formation of the resin layer two layers and the use of the resin of low water transmission rate for the resin layer (B). In this regard, a further description will be made subsequently herein.

(Production Method of Resin-Coated Metal Sheet)

A description will next be made about a production method of the resin-coated metal sheet in the present embodiment, although the present invention should not be limited to the following description.

The resin-coated metal sheet of the present embodiment is produced by preparing a resin for the resin layer (A) and a resin for the resin layer (B) and then forming the resin layer (A) and the resin layer (B) on at least one side of a metal sheet.

First, the resin for the resin layer (A) is obtained by blending the above-mentioned polyethylene terephthalate based resin (I) and the polybutylene terephthalate based resin (II). As a blending method, a known method can be used. For example, resin chips of the polyethylene terephthalate based resin (I) and those of the polybutylene terephthalate based resin (II) may be mixed together, and may then be charged into an extruder to melt and blend them. As an alternative method, resin chips of the polyethylene terephthalate based resin (I) and those of the polybutylene terephthalate based resin (II) may be separately charged into and melted in different extruders, and the polyethylene terephthalate based resin (I) and the polybutylene terephthalate based resin (II) may then be blended together before extrusion through a die.

The kneading temperature and kneading time in the extruder can be selectively set as desired. An excessively high kneading temperature is however not preferred, because transesterification proceeds between the polyethylene terephthalate based resin (I) and the polybutylene terephthalate based resin (II) or these resins undergo pyrolysis.

In the present embodiment, kneading may preferably be conducted at 255° C. to 295° C. for five to 30 minutes upon preparation of the resin for the resin layer (A).

Next, the resin for the resin layer (B) can be obtained by blending the above-mentioned polyethylene terephthalate based resin (III) and polybutylene terephthalate based resin (II) together A blending method or the like is similar to that for the resin for the resin layer (A).

A description will next be made about a method of forming the resin layer (A) and the resin layer (B) on at least one side of the metal sheet. In the present embodiment, a known method can be used as the method of forming the resin layers on the metal sheet. Examples may include a method that extrudes the respective resins in film forms directly onto the metal sheet through a T-die of an extruder (extrusion coating method) and a method that brings a two-layer resin film, which has been produced beforehand from the respective resins, into contact with a heated metal sheet, and bonds the two-layer resin film to the metal sheet under pressure.

In the present embodiment, the resin layer (B) is formed on the metal sheet, and further the resin layer (A) is formed on the resin layer (B). As a method of forming the two resin layers on the metal sheet as described above, a known method can be applied. In the case of the extrusion coating method, for example, the resin layer may be extruded after first directly extruding the resin layer (B) onto the metal sheet. As an alternative, the melted resins may be simultaneously formed into layers and laminated on the metal sheet by using a multi-manifold die or the like.

(Metal Can)

A description will next be made about the metal can in the present embodiment.

Using the above-described resin-coated metal sheet, the metal can in the present embodiment can be produced by a known method. Examples of the known can manufacturing method include drawing, drawing and ironing, stretch-drawing, stretch-ironing, and the like.

The metal can is configured from a can body (including a can body of a 3-piece can) and a can lid, and the above-described resin-coated metal sheet can be applied to both of these members.

The can lid can be applied as an easy-open can lid of the so-called stay-on tab type or an easy-open can lid of the so-called full-open type. In addition, such can lids can also be applied as top and bottom lids for a 3-piece can.

In the present embodiment, the formation of the resin layer (B) and the resin layer (A) on the outer surface of the metal can is preferred from the viewpoint of overcoming the occurrence of retort blushing (white spots) and the problem of film delamination at the same time. A resin film or a coating film may be laminated or formed additionally on an inner side of the metal can. The resin film on the inner surface of the can may be the same as the resin film as the outer side of the can.

In the metal can of the present embodiment, further layers such as a print layer and a protective layer may also be formed on an outer side of the resin layer (A).

<Evaluation on Contact Angle>

In the metal can of the present embodiment, the resin layer (A) may preferably have a contact angle of not greater than 42° with a wetting index liquid No. 40 (wetting tension: 40.0 mN/m) from the viewpoint of the adhesion with the print layer.

It is to be noted that in the case of a metal can, the contact angle with the wetting index liquid may vary depending on the can capacity or the location on the can body. In a small-capacity can, for example, the degree of working is small at the can body upon can manufacturing. In a large-capacity can, on the other hand, the degree of working is great at the can body. Further, even at the can body of the same can, the degree of working is greater at a location closer to a top portion of the can than at a location closer to the bottom of the can. In general, the wettability (contact angle varies depending on the degree of working of a resin.

Now, upon measuring the contact angle with the wetting index liquid in the present embodiment, the measurement around the middle of the can height is preferred. Described more specifically, the measurement, for example, at 40 to 120 mm above the bottom of the can is preferred.

The contact angle with the wetting index liquid may preferably be measured following JIS K 6768.

<Evaluation on Water Vapor Transmission Rate>

In the metal can of the present embodiment, the resin layers have a water vapor transmission rate of not greater than 400 g/m²·day (40° C., 90% RH) from the viewpoint of suppressing the occurrence of retort blushing (white spots).

A water vapor transmission rate of greater than 400 g/m²·day is not preferred, because the transmission of water to the metal sheet leads to a higher possibility of film delamination upon retorting.

In the present embodiment, the water vapor transmission rate may preferably be measured following JIS K 7129.

<Evaluation on Oriented Crystallization Peak Intensity by X-ray Diffractometry>

In the metal can of the present embodiment, the resin layers preferably have an oriented crystallization peak intensity of not smaller than 28 cps/μm when measured by X-ray diffractometry. An oriented crystallization peak intensity of smaller than 28 cps/μm is not preferred from the viewpoint of water vapor barrier properties.

In the present embodiment, the oriented crystallization peak intensity is expressed in terms of a value obtained by dividing, with a film thickness (μm), the value (cps) of a highest peak intensity among peaks of the (100) surface of the resin layer at X-ray diffraction angles 2θ in a range of 23° to 29°. The measurement of X-ray diffraction is conducted, for example, with an X-ray diffractometer ("Smart Lab," an automated multipurpose X-ray diffractometer (XRD) manufactured by Rigaku Corporation, or the like) under conditions of 40 kV tube voltage and 20 mA tube current by using Cu as a target (Cu—Kα).

EXAMPLES

The present invention will hereinafter be described more specifically by examples, although the present invention should not be limited to the following examples.

(Production of Resin-Coated Metal Sheet)

As a metal sheet for can bodies, A3004P H19 material in JIS H 1000, specifically an Al—Mn aluminum alloy sheet (thickness: 0.3 mm) was used.

In each example or comparative example of Table 1, a resin for the resin layer was prepared by mixing the polyethylene terephthalate based resin (I) and the polybutylene terephthalate based resin (II) in the proportions presented in Table 1. Described specifically, chips of the polyethylene terephthalate based resin (I) and chips of the polybutylene terephthalate based resin (II) were mixed, and the resulting mixed chips were charged into an extruder and were then melted and kneaded there. As kneading conditions, the kneading temperature was set at 255° C., the ratio Q/N of the delivery rate Q (Kg/h) to the extruder screw rpm N (rpm) was set at 1.0, and the residence time in the extruder was set to 20 minutes.

Similar to the resin for the resin layer (A), a resin for the resin layer (B) was also prepared using the polyethylene terephthalate based resin (III) and the polybutylene terephthalate based resin (II).

The resin for the resin layer (A) and the resin for the resin layer (B) were extruded in melted states through a multi-manifold die, allowed to flow downward via a pre-roll so that the resin layer (B) came into contact with the metal sheet, and nipped between laminating rolls to produce a metal sheet coated with a two-layer resin film.

The metal sheet was coated on the opposite side thereof with a two-layer resin formed of a polyethylene terephthalate based resin, which contained 15 mol % of isophthalic acid as a copolymerization component, and a polyethylene terephthalate based resin, which contained 2 mol % of isophthalic acid as a copolymerization component.

The resin layer (A) and the resin layer (B) of the resulting resin-coated metal sheet were measured for thickness by an electromagnetic coating thickness meter.

Further, the intrinsic viscosities (IV) of the polyethylene terephthalate based resin (I), the polybutylene terephthalate based resin (II), and the polyethylene terephthalate based resin (III) were determined as will be described next. Approximately 200 mg portions of the polyethylene terephthalate based resin (I), the polybutylene terephthalate based resin (II), and the polyethylene terephthalate based resin (III) were separately dissolved at 110° C. in a phenol/1,1,2,2-tetrachloroethane mixed solution (weight ratio 1:1), and the resulting solutions were separately measured for 30° C. specific viscosity by an Ubbelohde viscometer.

The intrinsic viscosity [η] (dl/g) was determined by the following formula:

$$[\eta]=[(-1+(1+4K'\eta sp)1/2)/2K'C]$$

K': the Huggins constant (=0.33)

C: concentration (g/100 ml)

ηsp: specific viscosity [=(falling time of solution−falling time of solvent)/falling time of solvent]

(Production of Metal Cans)

The resin-coated metal sheet obtained as described above was coated with a wax-based lubricant, followed by punching into disks (blanks) of the following three different diameters. The blanks were each worked into a can so that the resin layer (A) form the outer surface of the can.

Can template A • • • blank diameter: 119.5 mm
Can template B • • • blank diameter: 126.5 mm
Can template C • • • blank diameter: 156.5 mm The working of each can was performed in the following procedures. Drawing was first applied to the punched disk (blank) to produce a shallow drawn cup ironing was next applied to the shallow drawn cup, thereby producing a seamless cup of 50% ironing rate (decrease rate of the thickness of a side wall portion based on the original sheet thickness).

On the seamless cup, the forming of a can body and a can bottom was performed according to a usual method, followed by heat treatment at 220° C. for 60 seconds. An opening end portion was subsequently trimmed, followed by neck-forming and flange-forming to produce a seamless 2-piece metal can.

(Evaluation of Delamination)

With respect to each of the seamless 2-piece metal cans after the flange-forming of the can blanks A and B, the degree of separation of the outer surface resins at an edge of a flange was visually observed, and the adhesion between the outer surface resins and the metal sheet was evaluated as will be described next.

It is to be noted that in Table 1, the evaluation results of delamination are described without distinction of the can template A and the can template B because no difference arose between their evaluation results.

◯: No separation, and usable in practice.
Δ: Slight separation, but still usable in practice.
×: Pronounced separation, and not usable in practice.

(Evaluation of Retort Blushing)

As an example, each seamless 2-piece metal can described above was filled with water, and a usual can lid was then seamed, whereby a filled can was obtained. Next, the filled can was placed in a retort oven, and was subjected to autoclave sterilization treatment with steam at 125° C. for 30 minutes. After the autoclave sterilization treatment, the filled can was taken out of the retort oven, and dipped in water to allow it to cool down to room temperature. Evaluation was then visually made as to the occurrence/non-occurrence of retort blushing on a bottom portion of the can body.

It is to be noted that in Table 1, the evaluation results of retort blushing are described without distinction of the can template A and the can template B because no difference arose between their evaluation results.

◯: No occurrence of retort blushing (white spots), and usable in practice.
Δ: Localized occurrence of slight retort blushing (white spots), and still usable in practice.
×: Occurrence of retort blushing (white spots), and not usable in practice.
××: Clouding over the entire surface of the resin layers, and not usable in practice.

(Evaluation of Retort Delamination)

Each seamless 2-piece metal can described above was filled with water, and a usual can lid was then seamed, whereby a filled can was obtained. Next, a metal-made vat was placed in a retort oven, the filled can was placed upright in the vat with water filled therein so that an air-water interface arose to the side wall portion of the can, and the filled can was then subjected to autoclave sterilization treatment at 140° C. for five minutes. After the autoclave sterilization treatment, the filled can was taken out of the retort oven, and evaluation was then visually made as to the occurrence/non-occurrence of film lifting (delamination) on the side wall portion of the can.

It is to be noted that in Table 1, the evaluation results of retort delamination are described without distinction of the can template A and the can template B because no difference arose between their evaluation results.

◯: No occurrence of film lifting (delamination), and usable in practice.
Δ: Localized occurrence of slight film lifting (delamination), and still usable in practice.
×: Occurrence of film lifting (delamination), and not usable in practice.

(Comprehensive Evaluation)

Applicability for beverages and foods was comprehensively evaluated from the various can characteristics as will be described next.

It is to be noted that in Table 1, the comprehensive evaluation results are described without distinction of the can template A and the can template B because no difference arose between their comprehensive evaluation results.

◯: Applicable as a metal can for beverage or food.
×: Not applicable as a metal can for beverage or food.

(DSC Measurement of Resin Layer (A) and Resin Layer (B))

In each example or comparative example of Table 2, the resin layer (A) and the resin layer (B) were separately cut out from the resin-coated metal sheet obtained as described above, and their measurements were conducted using "DSC6000," a differential scanning calorimeter (DSC) marketed by Yamato Scientific Co., Ltd. After each resin layer was heated at a rate of 10° C./min from 0° C. to 290° C. and then maintained at 290° C. for three minutes, the resin layer was cooled at a rate of −10° C./min from 290° C. to 0° C. The presence/absence of a peak over 95±5° C. was confirmed in the heating cycle, and a cooling crystallization temperature was confirmed in the cooling cycle. The results of the measurement are presented in Table 2.

(Measurement of Logarithmic Damping Ratio by Rigid-Body Pendulum Type Physical Properties Testing Instrument)

In each example or comparative example of Table 3, a specimen of 20 mm width×50 mm length was cut out from the resin-coated metal sheet obtained as described above, and the resin was measured for logarithmic damping ratio by a rigid-body pendulum type physical properties testing instrument. The measurement was conducted on the resin layer that could become the outer surface of a metal can.

As the measurement instrument, "RPT-3000W" (manufactured by A&D Company, Limited) was employed. A frame shape (pendulum) of 2 mm pipe diameter and 12.4 g of frame weight was used. The measurement temperature range was set at 30° C. to 150° C., the heating rate was set at 10° C./min, and the specimen was fixed on a dedicated aluminum substrate. Under those conditions, the resin layer was measured for logarithmic damping ratio at three locations, and the average of the measured logarithmic damping ratios was recorded as data of logarithmic damping ratio. The results of the measurement are presented in Table 3.

(Measurement of Contact Angle by Wetting Index Liquid)

In each example or comparative example of Table 4, the measurement of the contact angle of the resin layer as the outer surface of the metal can, which had been obtained as described above, with a wetting index liquid was conducted as will be described hereinafter. For the measurement, metal cans of the can template C were used. The metal cans after the coating and heat treatment and a wetting index liquid, No. 40, were allowed to stand for 24 hours under an atmosphere of 23° C. and 50% RH. Under the same atmosphere, a 5 µL portion of the wetting index liquid was dropped onto each metal can at a location 0°, 45°, or 90° to the rolling direction of the metal sheet, and the contact angle was measured using a contact angle meter ("CA-X," an automatic contact angle meter manufactured by Kyowa Interface Science Co., Ltd.). The measurement was conducted on two metal cans for every 9 position (height from can bottom) shown in Table 4 and for every location (0°, 45°, and 90°), that is, six point per each position (height from can bottom), and the average of the values so obtained was recorded as the value of contact angle. The results of the measurement are presented in Table 4.

(Measurement of Water Vapor Transmission Rates)

In each example or comparative example of Table 5, the measurement of the water vapor transmission rate of the resin layers on the outer side of the metal can, which had been obtained as described above, was conducted as will be described hereinafter. The resin layers on the outer side of the metal can after the coating and heat treatment were stripped with an 8% solution of hydrochloric acid. The stripped resin layers were dried for 24 hours or longer under vacuum, and then provided as a specimen. It is to be noted that on the metal can, the resin layers were stripped at a location on the can body 30 mm above the bottom of the can body.

Following JIS K 7129, an increase in the mass of the specimen was measured at every predetermined interval in a constant-temperature and constant-humidity environment (40° C., 90% RH), and the amount of water vapor transmitted through the specimen per a predetermined time was determined. The measurement was conducted using "Lyssy L80-5000," a fully-automated water vapor permeability tester manufactured by Syatech/Illinois Instruments Ltd. The average of five measurements was recorded as a measurement value. The results of the measurement are presented in Table 5.

(Oriented Crystallization Peak Intensity by X-Ray Diffraction)

In each example or comparative example of Table 5, the oriented crystallization peak intensity by X-ray diffraction was measured under the following conditions:

X-ray diffractometer: "SmartLab," an automated multi-purpose X-ray diffractometer (XRD) manufactured by Rigaku Corporation
X-ray: CuKα X-ray (1.542 Angstrom)
Tube voltage: 40 kV
Tube current: 20 mA
X-ray beam diameter: 100 µm across
Detector: Curved position-sensitive detector (PSPC)

From the metal can after the coating and heat treatment, specimens of 29 mm diameter were punched out at locations 0° and 180° to the rolling direction of the metal sheet. The metal can was a can of the can template A, and the specimens were punched out from the locations 30 mm and 85 mm above the bottom. Concerning the can of the can template B, a specimen at a location 115 mm above the bottom was added.

Each specimen was fitted on a measuring cell. The measuring cell was mounted on a sample stage so that a surface of the specimen, the surface corresponding to the side of the outer surface of the can, could become a surface to be measured. The (100) surface of the resin layer was then subjected at X-ray diffraction angles 2θ in a range of 23° to 29° to X-ray diffraction measurement by a reflection method. A background correction was made to measurement data obtained by the peak-top method, whereby specimen data were obtained. The background correction was made by subtracting, from the measurement data, the average of diffraction intensities at X-ray diffraction angles 2θ of 29.45° and 29.55°. The data of the specimen was divided by the thickness of the resin layer to calculate the value (cps/µm) of oriented crystallization peak intensity. The results of the measurement are presented in Table 5.

Concerning the metal can subjected to the measurement of water vapor transmission rate and the measurement of oriented crystallization peak intensity by X-ray diffraction, delamination evaluation, retort blushing evaluation, retort delamination evaluation, and comprehensive evaluation were also made. Evaluation methods similar to the above-mentioned methods were used. The results of the above evaluations are all presented in Table 5.

TABLE 1

| | Resin layer (A) | | | | | | | Resin layer (B) | | | |
|---|---|---|---|---|---|---|---|---|---|---|---|
| | PET based (I) | | | | PBT based (II) | | | | PET based (III) | | | |
| Example | Blend amount (wt %) | IA amount (mol %) | Melting Point (° C.) | Intrinsic Viscosity (dl/g) | Blend amount (wt %) | Melting Point (° C.) | Intrinsic Viscosity (dl/g) | Film thickness (µm) | Blend amount (wt %) | IA amount (mol %) | Melting Point (° C.) | Intrinsic Viscosity (dl/g) |
| Example 1 | 65 | 9 | 228 | 0.90 | 35 | 225 | 1.14 | 3 | 65 | 2 | 245 | 0.90 |
| Example 2 | 65 | 9 | 228 | 0.90 | 35 | 225 | 1.14 | 3 | 65 | 5 | 237 | 0.90 |
| Example 3 | 70 | 9 | 228 | 0.90 | 30 | 225 | 1.14 | 3 | 65 | 7 | 233 | 0.90 |
| Example 4 | 70 | 9 | 228 | 0.90 | 30 | 225 | 1.14 | 3 | 70 | 5 | 237 | 0.90 |
| Example 5 | 50 | 9 | 228 | 0.90 | 50 | 225 | 1.14 | 3 | 50 | 1 | 248 | 0.90 |
| Example 6 | 80 | 9 | 228 | 0.90 | 20 | 225 | 1.14 | 3 | 80 | 1 | 248 | 0.90 |
| Example 7 | 50 | 9 | 228 | 0.90 | 50 | 225 | 1.14 | 3 | 80 | 1 | 248 | 0.90 |
| Example 8 | 80 | 9 | 228 | 0.90 | 20 | 225 | 1.14 | 3 | 50 | 1 | 248 | 0.90 |
| Example 9 | 50 | 9 | 228 | 0.90 | 50 | 225 | 1.14 | 3 | 80 | 8 | 231 | 0.90 |
| Example 10 | 80 | 9 | 228 | 0.90 | 20 | 225 | 1.14 | 3 | 50 | 8 | 231 | 0.90 |
| Example 11 | 50 | 15 | 213 | 0.90 | 50 | 225 | 1.14 | 3 | 50 | 8 | 231 | 0.90 |
| Example 12 | 80 | 15 | 213 | 0.90 | 20 | 225 | 1.14 | 3 | 80 | 8 | 231 | 0.90 |
| Comparative Example 1 | 85 | 9 | 228 | 0.90 | 35 | 225 | 1.14 | 3 | 65 | 9 | 228 | 0.90 |
| Comparative Example 2 | 85 | 9 | 228 | 0.90 | 35 | 225 | 1.14 | 3 | 65 | 12 | 220 | 0.90 |
| Comparative Example 3 | 70 | 9 | 228 | 0.90 | 30 | 225 | 1.14 | 3 | 65 | 15 | 213 | 0.90 |
| Comparative Example 4 | 100 | 7.5 | 231 | 0.90 | 0 | — | — | 3 | 100 | 7.5 | 232 | 0.90 |
| Comparative Example 5 | 65 | 15 | 213 | 0.90 | 35 | 225 | 1.14 | 3 | 65 | 15 | 213 | 0.90 |

TABLE 1-continued

| | | Resin layer (B) | | | | Evaluation | Evaluation | | |
| | | PBT based (II) | | | | of | of | | |
| Example | | Blend amount (wt %) | Melting Point (° C.) | Intrinsic Viscosity (dl/g) | Film thickness (μm) | Evaluation of delamination | retort blushing | retort delamination | Comprehensive evaluation |
|---|---|---|---|---|---|---|---|---|---|
| | Example 1 | 35 | 225 | 1.14 | 7 | Δ | ○ | ○ | ○ |
| | Example 2 | 35 | 225 | 1.14 | 7 | ○ | ○ | ○ | ○ |
| | Example 3 | 35 | 225 | 1.14 | 7 | ○ | ○ | Δ | ○ |
| | Example 4 | 30 | 225 | 1.14 | 7 | ○ | ○ | ○ | ○ |
| | Example 5 | 50 | 225 | 1.14 | 7 | Δ | ○ | ○ | ○ |
| | Example 6 | 20 | 225 | 1.14 | 7 | Δ | Δ | ○ | ○ |
| | Example 7 | 20 | 225 | 1.14 | 7 | Δ | ○ | ○ | ○ |
| | Example 8 | 50 | 225 | 1.14 | 7 | Δ | ○ | ○ | ○ |
| | Example 9 | 20 | 225 | 1.14 | 7 | ○ | ○ | Δ | ○ |
| | Example 10 | 50 | 225 | 1.14 | 7 | ○ | ○ | Δ | ○ |
| | Example 11 | 50 | 225 | 1.14 | 7 | ○ | ○ | Δ | ○ |
| | Example 12 | 20 | 225 | 1.14 | 7 | ○ | Δ | Δ | ○ |
| | Comparative Example 1 | 35 | 225 | 1.14 | 7 | ○ | ○ | X | X |
| | Comparative Example 2 | 35 | 225 | 1.14 | 7 | ○ | ○ | X | X |
| | Comparative Example 3 | 35 | 225 | 1.14 | 7 | ○ | ○ | X | X |
| | Comparative Example 4 | 0 | — | — | 7 | ○ | X | X | X |
| | Comparative Example 5 | 35 | 225 | 1.14 | 7 | ○ | ○ | X | X |

TABLE 2

| | Resin layer (A) | | | | | | |
| | PET based (I) | | | PBT based (II) | | Heating | Cooling |
| Example | Blend amount (wt %) | IA amount (mol %) | Melting Point (° C.) | Blend amount (wt %) | Melting Point (° C.) | crystallization temperature (° C.) | crystallization temperature (° C.) |
|---|---|---|---|---|---|---|---|
| Example 13 | 65 | 9 | 228 | 35 | 225 | 95.1 | 180.4 |
| Example 2 | 65 | 9 | 228 | 35 | 225 | 95.1 | 180.4 |
| Example 14 | 65 | 9 | 228 | 35 | 225 | 95.1 | 180.4 |
| Comparative Example 6 | 65 | 9 | 228 | 35 | 225 | 95.1 | 180.4 |
| Example 15 | 65 | 9 | 228 | 35 | 225 | 95.1 | 180.4 |
| Example 16 | 65 | 9 | 228 | 35 | 225 | 95.1 | 180.4 |
| Example 17 | 65 | 9 | 228 | 35 | 225 | 95.1 | 180.4 |
| Comparative Example 1 | 65 | 9 | 228 | 35 | 225 | 95.1 | 180.4 |

| | Resin layer (B) | | | | | | |
| | PET based (III) | | | PBT based (II) | | Heating | Cooling |
| Example | Blend amount (wt %) | IA amount (mol %) | Melting Point (° C.) | Blend amount (wt %) | Melting Point (° C.) | crystallization temperature (° C.) | crystallization temperature (° C.) |
|---|---|---|---|---|---|---|---|
| Example 13 | 70 | 2 | 245 | 30 | 225 | 103.0 | 204.9 |
| Example 2 | 65 | 5 | 237 | 35 | 225 | 104.0 | 187.9 |
| Example 14 | 70 | 5 | 237 | 30 | 225 | 105.7 | 199.0 |
| Comparative Example 6 | 70 | 15 | 213 | 30 | 225 | 96.6 | 174.5 |
| Example 15 | 75 | 5 | 237 | 25 | 225 | 104.9 | 200.5 |
| Example 16 | 80 | 5 | 237 | 20 | 225 | 108.4 | 200.7 |
| Example 17 | 70 | 7 | 233 | 30 | 225 | 103.3 | 192.0 |
| Comparative Example 1 | 65 | 9 | 228 | 35 | 225 | 94.9 | 180.0 |

TABLE 3

| Example | Resin layer (A) PET based (I) Blend amount (wt %) | Resin layer (A) PET based (I) IA amount (mol %) | Resin layer (A) PET based (I) Melting Point (° C.) | Resin layer (A) PBT based (II) Blend amount (wt %) | Resin layer (A) PBT based (II) Melting Point (° C.) | Resin layer (A) Film thickness (μm) | Resin layer (B) PET based (III) Blend amount (wt %) | Resin layer (B) PET based (III) IA amount (mol %) |
|---|---|---|---|---|---|---|---|---|
| Example 13 | 65 | 9 | 228 | 35 | 225 | 3 | 70 | 2 |
| Example 2 | 65 | 9 | 228 | 35 | 225 | 3 | 65 | 5 |
| Example 14 | 65 | 9 | 228 | 35 | 225 | 3 | 70 | 5 |
| Comparative Example 6 | 65 | 9 | 228 | 35 | 225 | 3 | 70 | 15 |
| Example 15 | 65 | 9 | 228 | 35 | 225 | 3 | 75 | 5 |
| Example 16 | 65 | 9 | 228 | 35 | 225 | 3 | 80 | 5 |
| Example 17 | 65 | 9 | 228 | 35 | 225 | 3 | 70 | 7 |
| Comparative Example 1 | 65 | 9 | 228 | 35 | 225 | 3 | 65 | 9 |

| Example | Resin layer (B) PET based (III) Melting Point (° C.) | Resin layer (B) PBT based (II) Blend amount (wt %) | Resin layer (B) PBT based (II) Melting Point (° C.) | Resin layer (B) Film thickness (μm) | Logarithmic damping ratio at 65° C. to 75° C. | Logarithmic damping ratio at 100° C. to 130° C. |
|---|---|---|---|---|---|---|
| Example 13 | 245 | 30 | 225 | 7 | 0.29 | 0.51 |
| Example 2 | 237 | 35 | 225 | 7 | 0.25 | 0.24 |
| Example 14 | 237 | 30 | 225 | 7 | 0.29 | 0.30 |
| Comparative Example 6 | 213 | 30 | 225 | 7 | 0.35 | 0.35 |
| Example 15 | 237 | 25 | 225 | 7 | 0.30 | 0.39 |
| Example 16 | 237 | 20 | 225 | 7 | 0.33 | 0.37 |
| Example 17 | 233 | 30 | 225 | 7 | 0.27 | 0.42 |
| Comparative Example 1 | 228 | 35 | 225 | 7 | 0.26 | 0.24 |

TABLE 4

| Example | Can template | Resin layer (A) PET based (I) Blend amount (wt %) | Resin layer (A) PET based (I) IA amount (mol %) | Resin layer (A) PET based (I) Melting Point (° C.) | Resin layer (A) PBT based (II) Blend amount (wt %) | Resin layer (A) PBT based (II) Melting Point (° C.) | Contact angle with wetting index liquid No. 40 (°) 20 mm | 40 mm | 60 mm | 80 mm | 100 mm | 120 mm | 140 mm | 160 mm | 180 mm |
|---|---|---|---|---|---|---|---|---|---|---|---|---|---|---|---|
| Comparative Example 7 | C | 100 | 12 | 220 | 0 | — | 40.1 | 40.7 | 40.8 | 40.6 | 40.8 | 40.6 | 40.7 | 40.9 | 40.7 |
| Example 18 | C | 65 | 10 | 225 | 35 | 225 | 40.6 | 41.2 | 41.2 | 40.9 | 41.3 | 40.9 | 41.7 | 41.7 | 41.0 |
| Comparative Example 8 | C | 70 | 7.5 | 231 | 30 | 225 | 42.2 | 42.6 | 42.6 | 42.3 | 43.1 | 43.9 | 43.8 | 43.1 | 43.0 |
| Comparative Example 9 | C | 100 | 5 | 237 | 0 | — | 43.8 | 43.6 | 43.9 | 43.7 | 43.9 | 44.8 | 45.4 | 45.1 | 43.5 |

TABLE 5

| Example | Can template | Resin layer (A) PET based (I) Blend amount (wt %) | Resin layer (A) PET based (I) IA amount (mol %) | Resin layer (A) PET based (I) Melting Point (° C.) | Resin layer (A) PBT based (II) Blend amount (wt %) | Resin layer (A) PBT based (II) Melting Point (° C.) | Resin layer (A) Film thickness (μm) | Resin layer (B) PET based (III) Blend amount (wt %) | Resin layer (B) PET based (III) IA amount (mol %) | Resin layer (B) PET based (III) Melting Point (° C.) | Resin layer (B) PBT Based (II) Blend amount (wt %) | Resin layer (B) PBT Based (II) Melting Point (° C.) | Resin layer (B) Film thickness (μm) |
|---|---|---|---|---|---|---|---|---|---|---|---|---|---|
| Comparative Example 10 | A | 70 | 9 | 228 | 30 | 225 | 3 | 70 | 9 | 228 | 30 | 225 | 7 |
| Comparative Example 11 | A | 70 | 12 | 220 | 30 | 225 | 3 | 70 | 9 | 228 | 30 | 225 | 7 |

TABLE 5-continued

| Example | | | | | | | | | | | | | |
|---|---|---|---|---|---|---|---|---|---|---|---|---|---|
| Example 4 | A | 70 | 9 | 228 | 30 | 225 | 3 | 70 | 5 | 237 | 30 | 225 | 7 |
| Example 19 | A | 70 | 12 | 220 | 30 | 225 | 3 | 70 | 5 | 237 | 30 | 225 | 7 |
| Example 20 | A | 70 | 9 | 228 | 30 | 225 | 3 | 75 | 5 | 237 | 25 | 225 | 7 |
| Example 15 | A | 65 | 9 | 228 | 35 | 225 | 3 | 75 | 5 | 237 | 25 | 225 | 7 |
| Comparative Example 12 | A | 70 | 9 | 228 | 30 | 225 | 3 | 100 | 9 | 228 | 0 | — | 7 |
| Cormarative Example 10 | B | 70 | 9 | 228 | 30 | 225 | 3 | 70 | 9 | 228 | 30 | 225 | 7 |
| Comparative Example 6 | B | 65 | 9 | 228 | 30 | 225 | 3 | 70 | 15 | 213 | 30 | 225 | 7 |
| Example 17 | B | 65 | 9 | 228 | 35 | 225 | 3 | 70 | 7 | 233 | 30 | 225 | 7 |
| Example 16 | B | 65 | 9 | 228 | 35 | 225 | 3 | 80 | 5 | 237 | 20 | 225 | 7 |
| Example 15 | B | 65 | 9 | 228 | 35 | 225 | 3 | 75 | 5 | 237 | 25 | 225 | 7 |
| Example 14 | B | 65 | 9 | 228 | 35 | 225 | 3 | 70 | 5 | 237 | 30 | 225 | 7 |
| Example 2 | B | 65 | 9 | 228 | 35 | 225 | 3 | 65 | 5 | 237 | 35 | 225 | 7 |

| Example | Water vapor transmission rate (g/m2 · day) | Oriented crystallization peak intensity (cps/μm) Measurement position from bottom | | | Evaluation of delamination | Evaluation of retort blushing | Evaluation of retort delamination | Comprehensive evaluation |
|---|---|---|---|---|---|---|---|---|
| | | 30 mm | 85 mm | 115 mm | | | | |
| Comparative Example 10 | 422.2 | 30.9 | 25.0 | — | X | ○ | X | X |
| Comparative Example 11 | 330.9 | 27.8 | 25.1 | — | X | ○ | X | X |
| Example 4 | 353.7 | 43.8 | 33.6 | — | ○ | ○ | ○ | ○ |
| Example 19 | 327.1 | 35.8 | 28.1 | — | ○ | ○ | ○ | ○ |
| Example 20 | 328.8 | 34.0 | 29.5 | — | ○ | ○ | ○ | ○ |
| Example 15 | 333.5 | 46.1 | 31.8 | — | ○ | ○ | ○ | ○ |
| Comparative Example 12 | 305.7 | 41.6 | 38.6 | — | ○ | Δ | X | X |
| Cormarative Example 10 | 318.0 | 35.0 | 29.3 | 24.9 | X | ○ | X | X |
| Comparative Example 6 | 330.8 | 16.6 | 20.9 | 17.4 | X | ○ | X | X |
| Example 17 | 318.0 | 44.6 | 33.6 | 28.4 | ○ | ○ | ○ | ○ |
| Example 16 | 318.0 | 58.4 | 43.1 | 32.4 | ○ | ○ | ○ | ○ |
| Example 15 | 305.3 | 50.4 | 36.4 | 28.2 | ○ | ○ | ○ | ○ |
| Example 14 | 294.4 | 44.4 | 33.8 | 29.3 | ○ | ○ | ○ | ○ |
| Example 2 | 378.9 | 40.0 | 32.1 | 28.5 | ○ | ○ | ○ | ○ |

Table 1 presents the results when the contents of isophthalic acid (the amounts of IA) in the PET based resins and the blend amounts of the PBT based resin (II) the resin (A) and the resin (B) were changed.

In Example 5 presented in Table 1, the content of isophthalic acid in the PET based resin (III) in the resin layer (B) was 1 mol %. If the content of isophthalic acid is changed to 5 mol % or 8 mol %, similar results are also obtained.

In Example 11, the content of isophthalic acid in the PET based resin (III) in the resin layer (B) was 8 mol %. If the content of isophthalic acid is changed to 1 mol % or 5 mol %, similar results are also obtained.

INDUSTRIAL APPLICABILITY

According to the present invention, the occurrence of retort blushing (white spots) and film delamination can be suppressed in beverage cans and food cans under diversified retort sterilization treatment conditions.

Further, the metal can of the present invention is highly effective in workability and working adhesion with a resin upon can manufacturing, resistance to scratches of its outer surface by contact with other cans or conveyor elements during conveyance, adhesion with a coating formulation or printing ink upon coating or printing after can manufacturing, and the like, and has extremely high industrial applicability.

The invention claimed is:

1. A resin-coated metal sheet comprising:
a metal sheet;
a two-layer resin film including a resin layer (A) disposed on at least one side of the metal sheet; and
a resin layer (B) disposed between the resin layer (A) and the metal sheet, wherein
the resin layer (A) contains 50 to 80 wt % of a polyethylene terephthalate based resin (I) and 20 to 50 wt % of a polybutylene terephthalate based resin (II),
the resin layer (B) contains 50 to 80 wt % of a polyethylene terephthalate based resin (III) and 20 to 50 wt % of the polybutylene terephthalate based resin (II),
both the polyethylene terephthalate based resin (I) and the polyethylene terephthalate based resin (III) contain isophthalic acid (IA), the resin layer (B) is higher than the resin layer (A) in crystallization rate, and
the polyethylene terephthalate based resin (I) has a melting point of not lower than 210° C. but not higher than 230° C., the polybutylene terephthalate based resin (II) has a melting point of not lower than 215° C. but not higher than 225° C., and the polyethylene terephthalate based resin (III) has a melting point of higher than 230° C. but not higher than 250° C., and
the melting point of the polyethylene terephthalate based resin (III) is 3° C. or more higher than the melting point of the polyethylene terephthalate based resin (I).

2. The resin-coated metal sheet according to claim 1, wherein the resin layer (A) has a heating crystallization temperature at 95±5° C. and a cooling crystallization temperature at lower than 183° C. in a measurement during a first scan by differential scanning calorimetry, and the resin layer (B) has no heating crystallization temperature at 95±5° C. and a cooling crystallization temperature at not lower than 183° C. in a measurement during a first scan by differential scanning calorimetry.

3. The resin-coated metal sheet according to claim 1, wherein the resin layer (A) and the resin layer (B) each have a logarithmic damping ratio of smaller than 0.3 at measurement temperatures of 65° C. to 75° C. and a logarithmic damping ratio of smaller than 0.35 at measurement temperatures of 100° C. to 130° C. when measured by a rigid-body pendulum type physical properties testing instrument.

4. The resin-coated metal sheet according to claim 1, wherein the resin layer (A) and the resin layer (B) have a total thickness of 5 to 15 μm.

5. A metal can formed from the resin-coated metal sheet according to claim 1, with the resin layer (A) disposed as an outer surface of the can.

6. The metal can according to claim 5, wherein the resin layer (A) has a contact angle of not greater than 42° with a wetting index liquid No. 40 having a wetting tension of 40.0 mN/m.

7. The metal can according to claim 5, wherein the resin layer (A) and the resin layer (B) have a water vapor transmission rate of not greater than 400 g/m2·day at a can body portion.

8. The metal can according to claim 5, wherein the resin layer (A) and the resin layer (B) have an oriented crystallization peak intensity of not smaller than 28 cps/μm at a can body portion when measured by X-ray diffractometry.

9. The resin-coated metal sheet according to claim 1, wherein the polyethylene terephthalate based resin (III) contains ethylene glycol as a sole glycol component.

* * * * *